Figure 2:
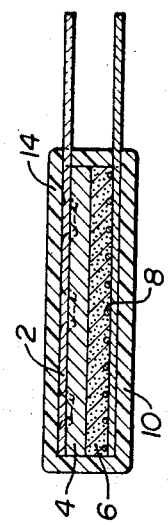

United States Patent
Moser

[15] 3,660,163
[45] May 2, 1972

[54] SOLID STATE LITHIUM-IODINE PRIMARY BATTERY

[72] Inventor: James R. Moser, Shrewsbury, Pa.

[73] Assignee: Catalyst Research Corporation, Baltimore, Md.

[22] Filed: June 1, 1970

[21] Appl. No.: 41,801

[52] U.S. Cl. ..........................................136/83 R, 136/137
[51] Int. Cl. .........................................................H01m 21/00
[58] Field of Search.....................136/83, 153, 137, 111, 86, 136/6, 136

[56] References Cited

UNITED STATES PATENTS

| | | | |
|---|---|---|---|
| 3,455,742 | 7/1969 | Rao | 136/83 |
| 3,438,813 | 4/1969 | Davis | 136/83 |
| 3,352,720 | 11/1967 | Wilson et al. | 136/137 |
| 3,057,760 | 10/1962 | Dereska et al. | 136/137 |
| 3,235,408 | 2/1966 | Harris | 136/137 X |
| 2,953,620 | 9/1960 | Smyth et al. | 136/83 |
| 3,073,884 | 1/1963 | Pinkerton | 136/100 |
| 3,443,997 | 5/1969 | Argue et al. | 136/153 X |
| 3,463,670 | 8/1969 | Rao et al. | 136/83 |
| 2,954,417 | 9/1960 | Lehovec et al. | 136/153 X |
| 3,498,843 | 3/1970 | Hunt et al. | 136/83 |

*Primary Examiner*—Anthony Skapars
*Attorney*—Ronald H. Shakely

[57] ABSTRACT

A substantially anhydrous solid state battery has a lithium anode, a solid lithium iodide electrolyte and an electronically conductive cathode containing iodine, such as organic iodine charge transfer complexes.

21 Claims, 3 Drawing Figures

PATENTED MAY 2 1972 3,660,163

INVENTOR
JAMES R. MOSER
BY Ronald H Shubert

SOLID STATE LITHIUM-IODINE PRIMARY BATTERY

This invention relates to a solid state primary cell having a lithium anode, an iodine cathode and a solid lithium halide electrolyte.

Gutman et al, J. Electrochem. Soc., 114, 323 (1967) made solid state cells utilizing anodes of certain divalent metals or silver and cathodes of electronically conducting charge transfer complexes; report energy densities of 1 watt-hour per pound and flash currents of 25 ma/cm² from cells with a magnesium anode and organic-iodine cathode. The same authors, J. Electrochem. Soc., 115, 359 (1968), report significant increase in flash current on admission of vapors of high permittivity liquids, such as water, to the anode-electrolyte interface.

It is an object of this invention to provide a solid state high-voltage, high energy density battery especially useful for long life, low current drain applications. The lithium-iodine cells of this invention have a high output voltage, typically an open circuit voltage of 2.7 to 3.0 volts depending primarily on cell design and the cathode material. The system has a theoretical energy density of about 213 watt-hours per pound and energy densities as high as 136 watt-hours per pound have been obtained during discharge of encapsulated cells at room temperature.

The cells of this invention comprise a lithium anode, a solid state lithium halide electrolyte, and a solid state electronically conductive cathode that contains iodine. The anode reaction is

and the cathode reaction is

giving an overall reaction

This electrochemical system is especially advantageous in that lithium has a high energy density, as the most electropositive metal with the lowest equivalent weight, and the electrolyte formed on discharge of the cell is LiI, the lithium salt having the highest ionic conductivity, much higher than the ionic conductivity of divalent halides.

The cathode iodine may be free iodine intimately admixed with a solid electronic conductor or, preferably, it is at least partially chemically bound as in organic-iodine charge transfer complexes. The electrolyte is preferably lithium iodide, which may be formed in situ by contacting the anode and cathode surfaces, whereby lithium reacts with iodine in the cathode to form a solid lithium iodide electrolyte layer contacting the anode and cathode. Alternatively, the electrolyte includes a coating of lithium iodide or other lithium halide on the lithium anode formed by reaction of the lithium with iodine or another halogen. The cathode is generally contacted against an inert current collector, suitably carbon or a metal inert to the cathode. An inert metal current collector is also generally used as a convenient method of providing electrical connection to the soft lithium anode.

Figure 3:
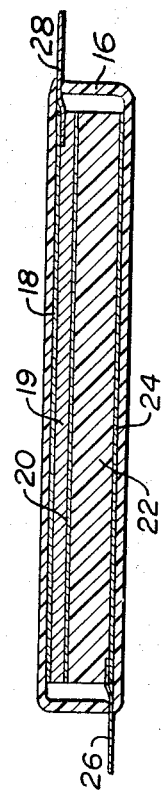
Figure 1:
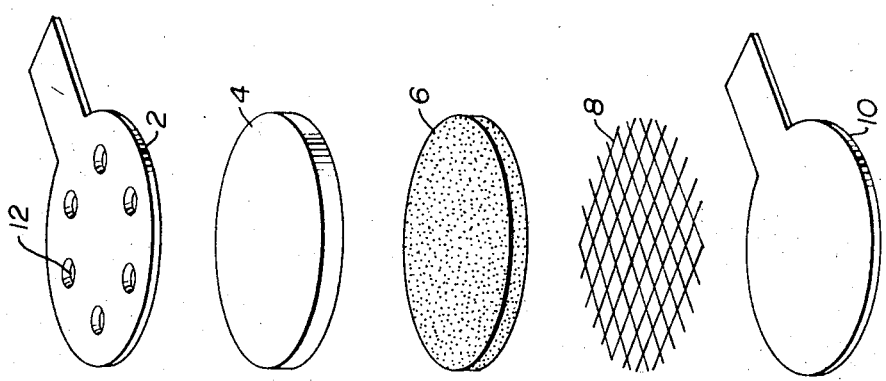

In the accompanying drawings, FIG. 1 is an exploded perspective view showing the components of a cell in accordance with this invention;

FIG. 2 shows the assembled cell of FIG. 1 encapsulated in a potting compound; and FIG. 3 is a sectional view of a preferred thin cell made in accordance with this invention.

Referring to FIG. 1, the cell comprises a metal anode contact member or current collector 2, a sheet lithium anode 4, a cathode 6, and a cathode current collector consisting of a metal screen 8 that is preferably spot-welded to a metal sheet 10. The cell components are stacked and the stack is compressed suitably at pressure of about 1000 psig., to form a complete cell. The anode contact member has holes 12 punched by a nail or other conical punch, giving projecting sharp edges that dig into and secure the contact member to the lithium anode. A metal screen or gauze may also be used to advantage as an anode contact member. The cathode material, suitably finely divided, is compacted when forming the cell into a solid disc having embedded therein the cathode contact screen 8. If desired, the cathode material may be compacted into a pellet of the desired size prior to assembly into the cell.

As shown in FIG. 2, the resulting cell, which has a plurality of laminated layers in intimate contact, is then encapsulated in an inert potting compound 14, suitably a polyester, that serves to protect the cell from degradation or exposure to the atmosphere.

A lithium iodide electrolyte is formed in situ by reaction of the iodine in the cathode with the lithium anode. It is equally satisfactory, and in some instances preferable, to form a film of lithium salt electrolyte on the anode surface abutting the cathode prior to cell assembly, most conveniently by exposing the anode surface to dry air or argon atmosphere containing halogen gas or vapor. It will be recognized that additional lithium iodide electrolyte is formed by the electrochemical reaction of the cell.

The cell of FIG. 3 may be made in the form of a thin sheet, as little as 15 to 20 mils thick, of any size. The cell is enclosed in plastic envelope 16, suitably polyvinyl chloride, such as Process 40, Teflon or other plastic film impervious to iodine and ordinary atmospheres, that is, oxygen, nitrogen and water vapor. A thin metallic anode current collector 18, suitably a nickel plate deposited on the plastic envelope by vacuum deposition or electroless plating, abuts a thin lithium electrode 19, suitably 1 to 10 mils thick. The lithium is most conveniently in the form of a foil, but it may also be deposited on the current collector by vacuum deposition, electroplating or other conventional methods. The initial thin film of lithium iodide electrolyte 20, may, as previously described, be preformed on the lithium surface before assembling the cell or formed spontaneously when the clean lithium anode surface is brought into contact with the cathode. The cathode 22 may be a compacted powder or is more conveniently applied to the anode as a paste of cathode material or cathode material and binder, for example, vinyl dispersions such as OKun's Liquid Vinyl. The cathode current collector 24 may be a thin metal foil or, as in the case of the anode current collector, a metal coating deposited on the plastic envelope. Metal leads 26 and 28, for external circuit connections, are connected to the anode and cathode current collectors respectively and tightly sealed through openings in the plastic envelope.

The cells of this invention are adversely affected by atmospheric moisture, so cells are assembled and encapsulated in a dry atmosphere, suitably in dry rooms or enclosures having a relative humidity less than about 2 percent, using substantially anhydrous and/or dried components. All of the cell assemblies and tests of non-encapsulated cells described herein were performed in such a dry room or in dry boxes having even dried air or argon atmospheres.

Charge transfer complexes of an organic material and iodine are preferred cathode materials for use in this invention, although any other cathode may be used that is electronically conductive and contains available iodine for the electrochemical reaction. Charge transfer complexes are a well-known class of materials that have two components, one an electron donor, the other an electron acceptor, that form weakly bonded complexes that exhibit electronic conductivity higher than either component. Suitable charge transfer complexes for this invention consist of an organic donor component and iodine, the electron acceptor, preferably having a conductivity of greater than about $2.5 \times 10^{-4}$ mho/cm. The charge transfer complexes are in chemical equilibrium with some small amount of free iodine that is available for electrochemical reaction. These charge transfer complexes have a wide range of electronic conductivity, and if the conductivity is low, the current output will be comparatively low because of the high internal ohmic resistance. Cathodes containing intimate mixtures of such low conductivity complexes with powdered graphite or inert metal have high conductivities and can provide performance comparable to cells using high conductivity complexes. Suitable charge transfer complexes may be prepared using as organic donor components polycylic aromatic compounds, such as, for example, pyrene, perylene, anthracene, naphthalene erythrosine, azulene and fluorene; organic polymers, such as, for example, polyethylene, polypropylene, polystyrene, polypyrrole, polyamides and polyvinyls; or heterocyclic compounds, containing nitrogen or sulfur, such as, for example, phenothiazine, phenazine, 10-phenylphenophiozine, thianthrene, 10-methylthiazine and methalyineblue; and polymerized or polymerizable compounds in which a heterocyclic nitrogen moiety is incorporated as a side chain or substituent, especially vinyl compounds and polymers, such as poly-2-vinyl quinoline, poly-2-vinyl pyridine, poly-4-vinyl pyridine, poly-5-vinyl-2-methylpyridine and poly-N-vinyl carbazole. The proportions of iodine to organic component can be varied over a wide range, although a high proportion of uncomplexed iodine in the cathode generally increases internal cell resistance. The cathode may be formed as a compact or pellet of powdered material, or it may be applied as a paste or deposited from solution with an inert solvent. Other iodine containing cathodes that are electronically conductive may also be used, such as mixtures of iodine and carbon or graphite.

Under constant current discharge at relatively high current densities, on the order of 50 to 100 $\mu A/cm^2$, the voltage decay of my new cells is linear with time. Generally, curves of cell voltage against time for discharge at such high current densities follow the equation:

$$\eta = -C \cdot (i/A)^2 \cdot t \cdot \exp(8650/RT)$$

where $\eta$ is polarization, $i/A$ is the current density and $C$ is a constant dependent on cell preparation methods and cathode material, typically $C$ equals about $1.25 \times 10^{-4}$ (ohm-cm)$^{-1}$/coulombs. There is markedly less polarization when cells are discharged at smaller current densities, for example, 10-25 $\mu A/cm^2$. At lower current densities, allowing cells to run for longer times, deviations from linearity are evident in discharge curves, especially at higher temperatures, which are the result of self-discharge.

Self-discharge involves diffusion of iodine from the cathode through the LiI electrolyte to the anode where additional electrolyte is then generated. This internal cell resistance resulting from the accumulation of electrolyte is dependent on the square root of storage time, as is typical for diffusion limited reactions. Although after long storage periods, the increase of internal resistance permits drawing only small currents, on the order of 1 $\mu A/cm^2$, such currents can be sustained for long periods of time.

The cells of this invention are more fully described in relation to the following illustrative examples:

EXAMPLE I

Primary cells were made using various electronically conductive cathodes containing iodine available for electrochemical reaction. Cathodes were made by mixing iodine with the other powdered cathode components, graphite and/or an organic material, and the mixture was compacted at 5250 psig. into a pellet 1.25 cm. in diameter and about 1 mm. thick. The organic materials used were those that react spontaneously with iodine to form a charge transfer complex. In some cases, as indicated, an organic $I_2$ charge transfer complex was separately prepared by conventional methods and then compacted into cathode pellets, either alone or admixed with graphite. The cathode pellet was placed between a 1.23 sq. cm. lithium anode and a nickel foil collector, wrapped with Teflon tape and compressed under slight pressure with a clamp. The lithium anode disc was cut from lithium ribbon that had been cleaned with petroleum ether and scraped. The cell was tested for open circuit voltage (O.C.V.), current output at various voltages ($\mu A/V$), and short circuit current (S.C.C.). The cells were then coated with lacquer and retested in 24 hours. Typical results are shown in Table I.

TABLE 1

| Battery number | Cathode composition | Initial test | | | | 24 hour test | | | |
|---|---|---|---|---|---|---|---|---|---|
| | | O.C.V. | S.C.C. ($\mu A$) | $\mu A/V$ | $\mu A/V$ | O.C.V. | S.C.C. ($\mu A$) | $\mu Q/V$ | $\mu A/V$ |
| 1 | 99% iodine, 1% carbon | 1.61 | 24 | 0.6/1.54 | 24/0.04 | 0.49 | 21 | 0.19/0.51 | 20/0.03 |
| 2 | 95% iodine, 5% carbon | 2.85 | 4,600 | 1.05/2.85 | 1,400/2.35 | 2.80 | 680 | .93/2.40 | 470/0.75 |
| 3 | 90% iodine, 10% carbon | 2.90 | 6,300 | 1.10/2.90 | 1,500/2.50 | 2.85 | 1,100 | 1.05/2.85 | 760/1.25 |
| 4 | 50% iodine, 50% polyethylene | 2.90 | 122 | 1.05/2.75 | 110/0.20 | 2.80 | 1,450 | 1.10/2.80 | 720/1.15 |
| 5 | 50% iodine, 50% polypropylene | 2.90 | 145 | 1.00/2.80 | 130/0.20 | 2.85 | 710 | 1.10/2.85 | 500/0.80 |
| 6 | 47½% iodine, 47½% polypropylene, 5% carbon | 2.85 | 470 | 1.00/2.85 | 380/0.65 | 2.75 | 1,650 | 1.07/2.75 | 790/1.30 |
| 7 | Pyrene 2 $I_2$ [1] | 2.95 | 630 | 1.10/2.95 | 450/0.80 | 2.95 | 150 | 1.06/2.90 | 135/0.30 |
| 8 | 50% pyrene 2 $I_2$ [1] 50% iodine | 3.00 | 480 | 1.10/3.00 | 370/0.70 | 2.90 | 305 | 1.06/2.85 | 255/0.45 |
| 9 | Pyrene 2 $I_2$ [2] | 3.00 | 1,600 | 1.10/3.00 | 770/1.35 | 2.95 | 3,100 | 1.10/2.95 | 1050/1.85 |
| 10 | 50% pyrene 2 $I_2$ [2] 50% iodine | 3.00 | 2,900 | 1.10/3.00 | 860/1.45 | 2.85 | 1,100 | 1.07/2.85 | 600/1.00 |
| 11 | 50% iodine, 50% phenothiazine | 2.95 | 1,200 | 1.07/2.95 | 680/1.15 | 2.90 | 1,450 | 1.09/2.90 | 740/1.25 |
| 12 | 47½% iodine 47½% phenothiazine 5% carbon | 2.90 | 2,700 | 1.02/2.90 | 1,050/1.85 | 2.85 | 1,750 | 1.08/2.85 | 820/1.35 |
| 13 | 2 phenothiazine 3 $I_2$ [3] | 2.85 | 118 | 1.07/2.85 | 104/0.20 | 2.85 | 102 | 1.09/2.75 | 93/0.15 |
| 14 | Perylene $I_2$ | 2.01 | 2,700 | | | 2.80 | 3,700 | | |

[1] Prepared by melting together pyrene and iodine.
[2] Prepared by precipitation from CCl$^4$ solution.
[3] Prepared by precipitation from benzene solution.

Other organic materials used with iodine in cells with similar performance, either with or without 5 to 10 percent added graphite, include nylon, Lucite, Lucite paste in dichloroethylene, pyrrole, polypyrrole, naphthalene, dimethyl glyoxime, phenolphthalien, phthalimide, erythrosine, methylene blue, urea, brominated pyrene, Teflon and o-tolidine.

EXAMPLE II

When a powdered electronic conductor, such as carbon or powdered metal is incorporated in the cathode to improve conductivity, it is preferred to form a film of electrolyte on the lithium anode before assembly of the cell to diminish internal short circuiting. The electrolyte film is formed by exposing the lithium surface to a dry air or argon atmosphere containing a vapor reactive with lithium to form a conductive salt of lithium, preferably the halogens, $I_2$, $Cl_2$, or $Br_2$, although other reactive vapors may be used, such as methanol or ethyl ether. To illustrate, cells were made in accordance with Example I having a cathode of 47½ percent pyrene·2$I_2$, 47½ percent iodine and 5 percent powdered carbon; one cell had a clean lithium anode and a second cell had a lithium anode coated with an LiI film. The results from performance tests as in Example I were as follows:

TABLE 2

| Anode | Initial Test | | 24-hour Test | |
|---|---|---|---|---|
| | OCV (Volts) | SCC (ma) | OCV (Volts) | SCC (ma) |
| Li | 2.20 | 3200 | 2.70 | 1000 |
| Li coated with LiI | 3.10 | 3500 | 3.00 | 3100 |

EXAMPLE III

Six cells one-half inch in diameter and 0.215 inch thick were made in accordance with FIG. 1 in which the anode contact was nickel foil, the anode was lithium, the cathode contact was 60-mesh nickel gauze and the cathode was a pellet of 2 phenothiazine·3I₂ charge transfer complex prepared by mixing together and heating phenothiazine and iodine in the indicated proportions. The lithium anode surface abutting the cathode was coated with a film of LiI formed by exposing the surface to iodine vapor in an argon atmosphere. The cell components were stacked and compressed at 1100 psig. to form the completed cell assembly. The cells were continuously discharged at a current of 25μA at 33°C. Table 3 shows the voltage at 25μA current drains and the short circuit current at various time intervals.

TABLE 3

| Time (hrs.) | Volts at 25μA | SCC (μA) |
| --- | --- | --- |
| 0 | 2.6–2.7 | 1-1-00–1600 |
| 25 | 2.3–2.4 | 250–400 |
| 49 | 1.3–1.5 | 50–80 |

EXAMPLE IV

Cells were made as in Example III, except that charge transfer complex contained different proportions of iodine. The cells were continuously discharged at a current of 25μA and periodic measurements were made of open circuit voltage and of the current output at a voltage one-half the open circuit voltage, as set out in Table 4.

TABLE 4

| Cathode | O.C.V. (volts) | | | | | Current Output at ½ O.C.V. (μA) | | | | |
| --- | --- | --- | --- | --- | --- | --- | --- | --- | --- | --- |
| | 0 hrs. | 16 hrs. | 46 hrs. | 52 hrs. | 63 hrs. | 0 hrs. | 16 hrs. | 46 hrs. | 52 hrs. | 63 hrs |
| 2 phenothiazine 2 I₂ | 2.7 | 2.7 | | 2.9 | | 1,500 | 53 | | 8 | |
| 2 phenothiazine 3½ I₂ | 2.7 | 2.8 | 2.9 | | 2.9 | 2,100 | 50 | 12 | | 5 |
| 2 phenothiazine 4 I₂ | 2.8 | 2.9 | 2.9 | | 2.9 | 3,100 | 50 | 14 | | 4.8 |
| 2 phenothiazine 4½ I₂ | 2.9 | 2.9 | | | 2.9 | 550 | 50 | | | 4.8 |

The performance of cells containing or using 2 Phenothiazine·cOI₂ or larger proportions of iodine becomes comparable on discharge of the cell, although the initial performance cells with more iodine than about 2 Phenothiazine·4 I₂ is diminished because of the higher ohmic resistance of such cathodes. When using less iodine than about 2 Phenothiazine·2D—2, the performance over the entire life decreased apparently due to less available iodine.

EXAMPLE V

Cells were made in which 2 Phenothiazine·3I₂ complex was mixed with a binder and painted on a nickel collector and contacted against a lithium foil disc anode to form a complete cell one-half inch in diameter. The cells were discharged to zero voltage at a current density of 50μA/cm² giving the life shown in Table 5 for varying proportions of binder and charge transfer complex.

TABLE 5

| Parts 2 Phenothiazine·3I₂ | Parts Binder | Life (hours) |
| --- | --- | --- |
| 7 | 5 Huebeck Lacquer | 40 |
| 8 | 5 Huebeck Lacquer | 72 |
| 9 | 5 Huebeck Lacquer | 36 |

EXAMPLE VI

Poly-4-vinyl pyridine·I₂ (P4VP·I₂) complex was prepared by polymerizing 4-vinyl pyridine in benezene solution using n-butyllithium polymerization initiator, and then adding an excess of iodine solution in benzene to precipitate the charge transfer complex containing 105 parts by weight poly-4-vinyl pyridine to 254 parts of iodine. The precipitate was filtered, vacuum dired and 3 parts of the complex were mixed with 10 parts of powdered iodine. This mixture was pressed into ½ inch diameter discs at 50 psig. for use as cathodes. Cells as shown in FIG. 1 were made using the cathode material, a lithium anode cut from 1/16-inch thick anode and cathode collectors; the cell being compressed at 10 psig. and potted in polyester potting compound. The performance characteristics of cells were measured as follows:

| | |
| --- | --- |
| O.C.V. | 2.9 V |
| S.C.C. | 2.5 ma |
| Life at Room Temperature discharge at 50μA/cm² current density | 333 hours |
| Life at Room Temperature discharge at 100μA/cm² current density | 141 hours |
| Cell voltage after 645 hours discharge Room Temperature at 10μA/cm² | |
| 60°C. at 10μA/cm² | 2.35 V |
| −40°C. at 0.2μA/cm² | 0.60 V. |

Another cell, identical except that 5-vinyl-2-methylpyridine was used in place of 4-vinylpyridine had a cell life of 250 hours at a discharge rate of 50μA/cm² at room temperature.

EXAMPLE VII

It has been jointly discovered with Alan A. Schneider, of Baltimore, Maryland, that cells in accordance with this invention and having cathodes of poly-2-vinylpyridine-iodine or poly-2-vinylquinoline-iodine charge transfer complexes with excess of iodine exhibit unexpected superior performance several times better even than other cells of this invention. Poly-2-vinylpyridine·I₂ or poly-2-vinylquinoline·I₂ charge transfer complexes are prepared in benzene as in Example VI except using either 2-vinylpyridine or 2-vinylquinoline in place of the 4-vinylpyridine. The complexes precipitated from the benzene contain a stoichiometric amount of iodine, that is 71 percent I₂ in the case of poly-2-vinylpyridine and 62 percent I₂ in the case of poly-2-vinylquinoline. When either of these charge complexes are mixed with about 3 to 15 parts of iodine for each part of complex, a paste-like solid is formed that is sufficiently plastic to be easily spread on a solid substrate, such as the lithium anode or a metal current collector. It is believed that the plastic state of the materials permit excellent atomic bonding of the cathode to the anode and to the cathode current collector resulting in greater outputs from the cell. In addition, this material has substantially the same electrical resistance over a wide range of iodine content, so that the cathode resistance does not change during cell discharge. The preferred cathode contains from about 10 to 15 parts I₂ to each part charge transfer complex.

To illustrate the much superior performance of such cells, cells made as illustrated in FIG. 3, with a 0.012 inch thick lithium anode and a 0.048 inch thick cathode of 10 parts I₂ for each part poly-2-vinylpyridine·I₂ (93.2 percent by weight iodine, 6.8 percent by weight poly-2-vinylpyridine) had open circuit voltage of 2.80 volts and a cell voltage of 0.24 volts after 1000 hours discharge at a current density of 50μA/cm²; 2.16 volts after 1000 hours discharge at 25μA/cm²; and 2.69 volts after 1000 hours discharge at 10μA/cm².

I claim:

1. A substantially anhydrous cell comprising a solid lithium anode, a solid lithium iodide electrolyte and a solid electronically conductive iodine cathode containing a charge transfer complex of an organic donor component and iodine.

2. A cell according to claim 1 in which the cathode contains carbon.

3. A cell according to claim 1 in which the organic component is a heterocyclic nitrogen compound.

4. A cell according to claim 3 in which the heterocyclic compound is phenothiazine.

5. A cell according to claim 3 in which the heterocyclic compound is a polymer of a vinyl compound having a heterocyclic nitrogen substituent.

6. A cell according to claim 5 in which the heterocyclic compound is poly-4-vinylpyridine.

7. A cell according to claim 1 in which the organic donor component is a polycyclic aromatic compound.

8. A cell according to claim 1 in which the cathode consists of a mixture iodine and the charge transfer complex.

9. A cell according to claim 8 in which the organic component is a heterocyclic nitrogen compound.

10. A cell according to claim 9 in which the organic component is phenothiazine.

11. A cell according to claim 9 in which the organic component is poly-4-vinylpyridine.

12. A cell according to claim 10 in which the proportion of phenothiazine to iodine is between about 3 to 1 and 4 to 1.

13. A cell according to claim 1 in which the anode surface is coated with a lithium halide.

14. A cell according to claim 13 in which the halide is lithium iodide.

15. A primary cell according to claim 1 comprising a laminate of the anode and cathode, the electronically conductive component of said cathode consisting of a charge transfer complex of an organic donor component and iodine, said anode and cathode forming therebetween a solid LiI laminae.

16. A cell according to claim 15 in which the cathode is a mixture of iodine and charge transfer complex.

17. A cell according to claim 16 in which the organic component is a heterocyclic nitrogen compound.

18. A cell according to claim 17 in which the organic component is a polymer of a vinyl compound having a heterocyclic nitrogen substituent.

19. A cell according to claim 15 enclosed in a flexible plastic film substantially impervious to iodine, oxygen, nitrogen and water vapor.

20. A cell according to claim 1 encapsulated in a material substantially impervious to iodine, oxygen, nitrogen and water vapor.

21. A cell according to claim 18 in which the heterocyclic component is poly-4-vinylpyridine.

* * * * *